United States Patent [19]

Geen

[11] Patent Number: 5,869,760
[45] Date of Patent: Feb. 9, 1999

[54] MICROMACHINED DEVICE WITH ROTATIONALLY VIBRATED MASSES

[75] Inventor: John A. Geen, Tewksbury, Mass.

[73] Assignee: Analog Devices, Inc., Norwood, Mass.

[21] Appl. No.: 867,602

[22] Filed: Jun. 2, 1997

Related U.S. Application Data

[62] Division of Ser. No. 471,023, Jun. 6, 1995, Pat. No. 5,635,640.

[51] Int. Cl.⁶ .................................................. G01P 3/00
[52] U.S. Cl. .................... 73/504.12; 73/510; 73/514.29; 73/504.04
[58] Field of Search ........................... 73/504.12, 504.04, 73/504.03, 514.29, 514.37, 514.38, 514.32, 362.59, DIG. 1, DIG. 4, 510; 310/308, 309

[56] References Cited

U.S. PATENT DOCUMENTS

| | | | |
|---|---|---|---|
| 4,782,700 | 11/1988 | Hulsing | 73/504.12 |
| 4,811,602 | 3/1989 | Hulsing | 73/504.04 |
| 4,821,572 | 4/1989 | Hulsing, II | 73/504.04 |
| 4,848,156 | 7/1989 | Hulsing | 73/504.04 |
| 4,864,861 | 9/1989 | Hulsing | 73/504.12 |
| 5,025,346 | 6/1991 | Tang et al. | 361/283 |
| 5,168,756 | 12/1992 | Hulsing, II | 73/504.02 |
| 5,203,208 | 4/1993 | Bernstein | 73/504.12 |
| 5,241,861 | 9/1993 | Hulsing, II | 73/504.04 |
| 5,249,465 | 10/1993 | Bennett et al. | 73/510 |
| 5,275,048 | 1/1994 | Hulsing, II et al. | 73/514.01 |
| 5,313,835 | 5/1994 | Dunn | 73/514.15 |
| 5,331,853 | 7/1994 | Hulsing, II | 73/505 |
| 5,341,682 | 8/1994 | Hulsing, II | 73/504.04 |
| 5,349,855 | 9/1994 | Bernstein et al. | 73/505 |
| 5,367,217 | 11/1994 | Norling | 310/370 |
| 5,377,544 | 1/1995 | Dunn | 73/504.08 |
| 5,392,650 | 2/1995 | O'Brien et al. | 73/514.18 |
| 5,396,797 | 3/1995 | Hulsing, II | 73/505 |
| 5,635,638 | 6/1997 | Geen | 73/504.04 |

FOREIGN PATENT DOCUMENTS

| | | |
|---|---|---|
| 0623807 | 11/1994 | European Pat. Off. . |
| WO 92/14160 | 8/1992 | WIPO . |
| WO 93/14409 | 7/1993 | WIPO . |
| WO 94/14076 | 6/1994 | WIPO . |

OTHER PUBLICATIONS

Geen, "Inertial Sensor Micromaching at Northrop", *Institute of Navigation*, Jun. 1993.

Hulsing, II et al., "Miniature IMU Based on Micro–machined Coriolis Sensors", *Institute of Navigation* (1993) no month.

Hunt et al., "Development of an Accurate Tuning–Fork Gyroscope", *Proc. Inst. Mech. Engrs.*, vol. 179, pt. 3B, 1964–65, no month.

Ljung, "Surface Micromachined Gyro Structure" (1993). (no month).

*Primary Examiner*—Christine K. Oda
*Attorney, Agent, or Firm*—Hale and Dorr LLP

[57] ABSTRACT

A micromachined device has a plurality of rotationally dithered masses that are used to sense acceleration. To eliminate common modes, the masses are dithered in an equal and opposite manner. To help maintain this relationship between the movement of the masses, a coupling fork provides minimal resistance to anti-phase movement and substantial resistance to in-phase movement. Electrodes are used to detect changes in capacitance between the masses and the substrate resulting from rotation of the device about a radial axis of a mass. These electrodes are electrically connected to eliminate gradients that are caused by external forces and manufacturing differences. Four masses or more can be provided, arranged in a two-dimensional array, such as a square or hexagon with a coupling fork provided between each pair of masses, and with electrodes connected to eliminate gradients.

15 Claims, 3 Drawing Sheets

MICROMACHINED DEVICE WITH ROTATIONALLY VIBRATED MASSES

This is a divisional of application Ser. No. 08/471,023 filed on Jun. 6, 1995, now U.S. Pat. No. 5,635,640.

FIELD OF THE INVENTION

This invention relates to a micromachined sensing device.

BACKGROUND OF THE INVENTION

In one type of micromachined device for measuring a rate of rotation about a rate axis, a planar mass is dithered, or oscillated, along a dither axis at a constant frequency. The dither axis is perpendicular to the rate axis, with the plane of the mass parallel to both the dither axis and the rate axis. This dithering causes the mass to experience a Coriolis acceleration along a sensitive axis, which is orthogonal to the plane of the mass (and to the dither axis and the rate axis), when the mass rotates about the rate axis. This Coriolis acceleration is proportional to the dithering velocity and to the angular rate of rotation, and therefore, has a frequency related to the frequency at which the mass is dithered.

A planar Coriolis electrode parallel to the plane of the mass senses a change in capacitance caused by an acceleration along the sensitive axis. The change in capacitance is used to measure the acceleration. In addition to the periodic rotational component (from the Coriolis acceleration) with a frequency related to the dithering frequency, the acceleration may have a DC component caused by a force acting linearly along the sensitive axis. To separate the rotational and linear components of the acceleration, two adjacent masses are separately dithered with identical sinusoidal signals with opposite phase. The resulting output signals from the two masses can be added or subtracted to cancel the rotational or linear components, respectively.

In another particular version of such a micromachined device, a micromachined rotor is suspended from a frame by four elastic beams that converge at a central anchor point. The rotor has four, small radial projections that have fingers that interdigitate with comb fingers to rotationally dither the rotor. This motion generates a periodic momentum vector along a sensitive axis that is perpendicular to a plane of rotation. The rotor can thus be used to detect rotation about an axis in the two dimensional plane of rotation. In this particular device, the Coriolis electrodes are small and the structure is not balanced, thus causing instability. Moreover, the device is subject to external influences, and therefore may provide less accurate measurement than desired.

SUMMARY OF THE INVENTION

According to the present invention, a micromachined device has at least two masses that are suspended over a substrate. Each mass is rotationally dithered, with pairs of adjacent masses being dithered with equal and opposite signals, i.e., same amplitude, same frequency, and opposite phase.

Each mass preferably has a circular beam and a pair of sectors, each sector extending away from the circular beam on an opposite side of the circular beam. Along radial edges of the sectors are fingers that extend normal to the radial dimension. A dithering signal is provided by dither drive combs that have fingers that interdigitate with the fingers extending from the sectors.

In one aspect of the present invention, a coupling extends between pairs of adjacent masses to allow relative anti-phase movement and to substantially resist relative in-phase movement. The coupling preferably includes an elongated fork shaped as an annular rectangle having two long sides and two short sides. The fork is centrally coupled to adjacent edges of the circular beam of each mass at or near the midpoint of each long side of the fork. As the masses move in an anti-phase manner, the fork moves perpendicular to a line between the centers of the circular beams with minimal resistance, but when the masses move in an in-phase manner, the fork is urged to deform, and thus provides substantial resistance. The fork could take some other shape, such as an elongated ellipse.

In another aspect of the present invention, under each sector is a Coriolis electrode; therefore, there are two such electrodes per mass, and four electrodes for a pair of masses. The sectors and electrodes are preferably large, preferably about 60° with a radial length about equal to the diameter of the circular beam, to provide good measurement of capacitance. These electrodes are electrically interconnected to cancel out electrical or thermal gradients that could otherwise develop due to external forces or process variations. In one embodiment, an electrode on each side of a first mass is coupled to an electrode on an opposite side of an adjacent second mass.

In still another aspect, the invention includes suspension beams extending from the sectors to anchors to prevent the sectors from touching the substrate. Each suspension beam extends radially outward from a portion of the sector, then double-backs to an anchor. The beams prevent contact with the substrate and also allow rotational motion.

In yet another aspect, the micromachined device has four masses, preferably arranged in a square, which move so that local momentum is conserved among the masses. The Coriolis electrodes are electrically connected to cancel gradients, and four couplings are provided, one between each pair of adjacent masses.

More than four masses can be provided in a two dimensional array. The array can be based on a square cell or some other shape, such as a hexagonal cell. In each case, a large array can provide for redundancy in the plane in which the masses are formed to provide greater reliability. Such reliability could be useful for high precision applications. The hexagonal cell has an additional advantage relative to a square cell in that it has more space so that the electrodes can be made larger.

The present invention provides a sensor that has couplings that help maintain proper movement, and electrical connections that minimize gradients in the device. These features help improve accuracy. Other features and advantages will become apparent from the following detailed description and from the claims.

DETAILED DESCRIPTION

Figure 1:
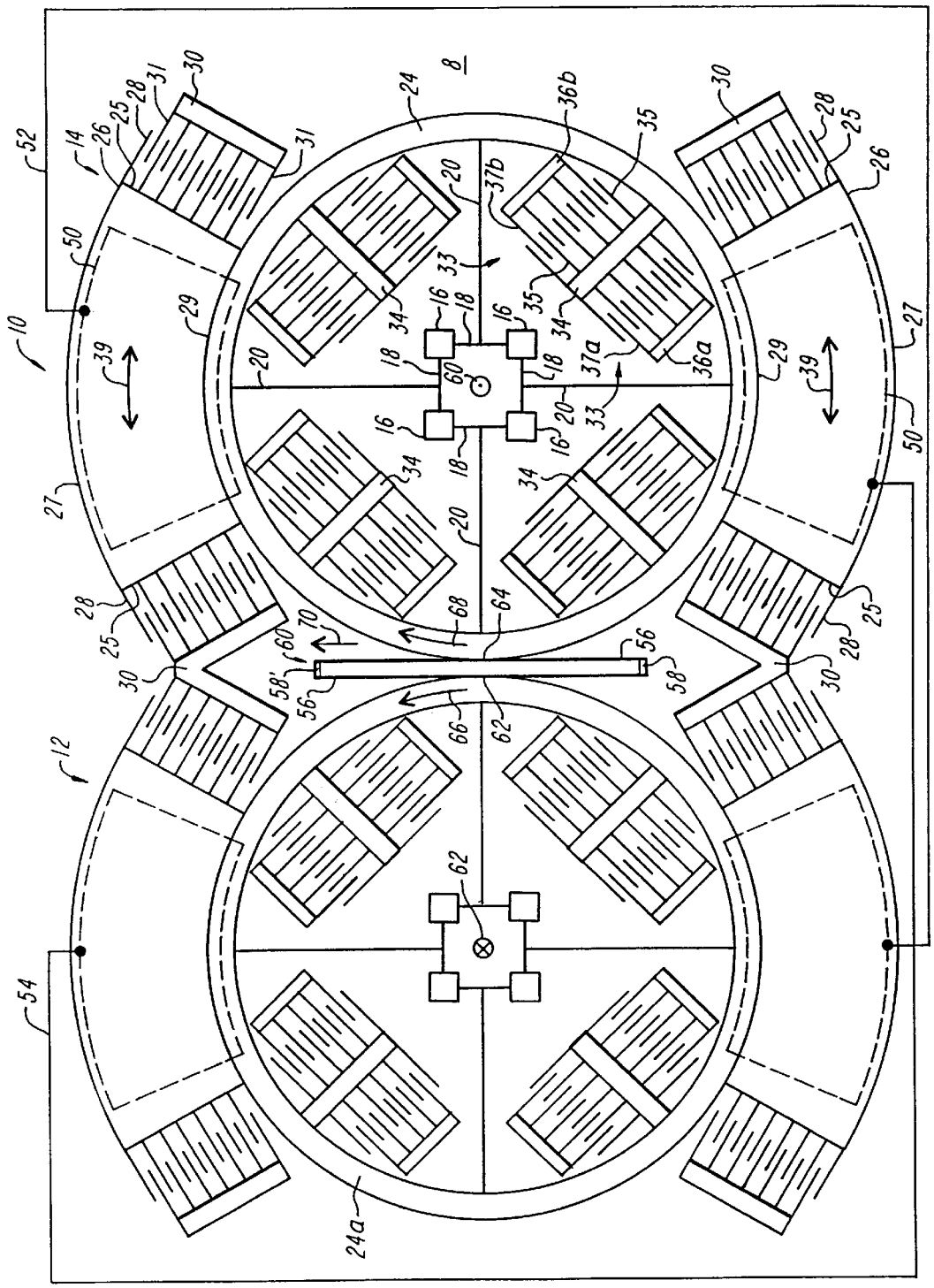
FIGS. 1–4 are plan views of a device according to different embodiments of the present invention.

Referring to FIG. 1, a surface micromachined device 10 has two accelerometers 12 and 14, each of which is suspended over a substrate 8 (which is in the background). Accelerometer 12 is substantially similar in structure to accelerometer 14, which is described here in detail. Accelerometer 14 has a mass including a circular beam 24 suspended over substrate 8 with four anchors 16. Anchors 16 are arranged at corners of a square that is around the center of the beam 24. Four stress relief beams 18 form the sides of the square and are coupled to circular beam 24 with four tether beams 20, each of which extends radially outward from a midpoint of a respective stress relief beam to circular beam 24.

Extending radially outward from circular beam 24 are two sectors 26 that are centered on opposite sides of beam 24, i.e., separated by 180°. The sectors each have a wide surface area, preferably having an angle of about 60° each, and a radial length that is about the same as the diameter of the circular beam. A line connecting the centers of the two sectors for each mass is perpendicular to a line connecting the centers of the circular beams of accelerometers 12, 14. The sectors have radial edges 25, an outer circumferential edge 27, and an inner "edge" 29 that is integral with the circular beam.

Fingers 28 extend from radial edges 25 in a direction normal to the radial direction, and interdigitate with fingers 31 of a dither drive comb 30 that is anchored to the substrate. Drive comb 30 is coupled to a signal source (not shown) that provides a signal that rotationally dithers the mass in a sinusoidally oscillating manner, as shown by directional arrow 39.

The dithering velocity is sensed by four sets of dither pickoff combs 36a and 36b that have fingers 37a and 37b, respectively. Four beams 34 extend radially inwardly from circular beam 24 at an angle of about 45° relative to tether beams 20 and have fingers 35 extending in a direction that is normal to the radial direction of beams 34. Fingers 35 interdigitate with fingers 37a and 37b of dither pickoff combs 36a and 36b, to form differential capacitors 33. Clockwise rotation of circular beam 24 causes the capacitance of the capacitor formed by fingers 35 and 37a to increase, and the capacitance of the capacitor formed by fingers 35 and 37b to decrease. Circuitry (not shown) senses changes in these capacitances and provides an output signal based on the velocity of the mass in the plane of movement. The output signal is also fed back to the dither drive combs to maintain the accuracy of the drive signal.

Any rotation of accelerometer 14 about a radial axis of circular beam 24, in combination with the dithering velocity, causes a Coriolis acceleration along sensitive axis 60, which is orthogonal to the plane of circular beam 24.

Accelerometer 12 is driven similarly to accelerometer 14, but with a signal that causes a dithering velocity that is equal in amplitude and frequency, and opposite in phase to the dithering velocity of accelerometer 14; ideally, therefore, one mass rotates clockwise while the other rotates counterclockwise in an equal manner at the same time.

Under each sector 26 is a Coriolis electrode 50, which can be made from polysilicon or an inert metal on the surface of substrate 8, or from a diffused region. Electrode 50 is used to sense a change in capacitance between itself and a respective sector 26. The change in capacitance between electrode 50 and sector 26 is used to derive an acceleration along sensitive axes 60, 62 (corresponding to accelerometers 14, 12). Because the sectors are large relative to the circular beam, electrodes 50 can be made similarly large, i.e., having an angle of about 60° and a radial length similar to the diameter of the circular beam. Because capacitance between plates is proportional to the area of the plates, the large surface areas of the sectors and electrodes improve measurement over small radial projections. Accordingly, to increase capacitance, the sectors and electrodes are preferably made as large as reasonably possible.

The acceleration along sensitive axes 60, 62 includes any externally imposed linear component, A, and a time-varying rotational component, a(w). The rotational component varies at angular dithering frequency w and is proportional to both the rate of rotation about a radial rate axis perpendicular to the dithering, and to the dither velocity vector. Accordingly, the accelerations sensed by the two electrodes of accelerometer 14 are A+a(w) and A−a(w), respectively, because the dither velocities are opposed. By subtracting these accelerations, linear component A mostly cancels out, leaving the rotational component.

The effectiveness of such cancellation depends mainly on the match between the areas of electrodes and the corresponding gaps between the electrodes and the sectors. Both of these dimensions are subject to gradients in the manufacturing process and in temperature. The error in the detected signal can be greatly reduced by subtracting the corresponding signal generated from accelerometer 12, which is adjacent but moving in the opposite manner. The errors would be expected to be similar and cancel out whereas the signals reinforce.

Consequently, the desired equal and opposite velocity relationship between the masses is important to allow the residual error component of the acceleration to be cancelled. To help maintain this relationship in a mechanical manner, a coupling fork 60 is provided between circular beam 24 of accelerometer 14 and circular beam 24a of accelerometer 12. The coupling fork is shaped as a rectangular annulus having two long sides 56 and two short sides 58. Fork 60 is coupled to beams 24, 24a at points 64 and 62, the midpoints of long sides 56. In this case, the midpoint need not be a narrow point; rather, a central portion of the long sides can be integral with the circular beams. The coupling points could instead be at two separate points per coupling beam, with the two points an equal distance from the midpoint. In each case, it is preferred that the fork be centrally connected to the circular beams. The fork is integrally formed with both circular beams 24, 24a, and thus is suspended over the substrate along with beams 24, 24a.

During anti-phase movement in which beams 24, 24a move counterclockwise and clockwise, as indicated by arrows 66, 68, fork 60 translates slightly along axis 70, which is perpendicular to a line between the centers of the masses. This movement causes a slight outward bowing in fork 60 at points 62, 64 as these points diverge, but overall there is little resistance to this movement. Because the coupling beams each have a radius of about 200 microns and move with about 10 microns of movement, the circular beams rotate only about 3° (0.05 radians).

The resistance increases the more one circular beam lags the other by more than a 180° phase difference. During in-phase movement, in which both masses move clockwise or counterclockwise at the same time, fork 60 is urged to be substantially deformed because points 62, 64 are pulled in opposite directions along axis 70. Therefore, fork 60 provides substantial resistance to such movement. Consequently, by encouraging equal anti-phase movement, in which there is least resistance, and by discouraging in-phase movement, fork 60 improves measurement by allowing better cancellation of components.

The placement of, and connections among, the Coriolis electrodes in the present invention also improves measurement. Due to process variations in manufacture, differences between accelerometers 12, 14 can create thermal and/or electrical gradients that can adversely affect electrical measurements. To neutralize these potential gradients, electrodes 50 are electrically connected with lines 52, 54 such that the electrodes on opposite sides of adjacent accelerometers are coupled together. For example, if a process variation causes one accelerometer to provide a voltage that indicates a small rotational acceleration when there is none (akin to a zero offset), voltage that is caused by that variation is also provided to the other mass so that when the accelerations are subtracted, the effect of the process variation is cancelled.

Figure 2:
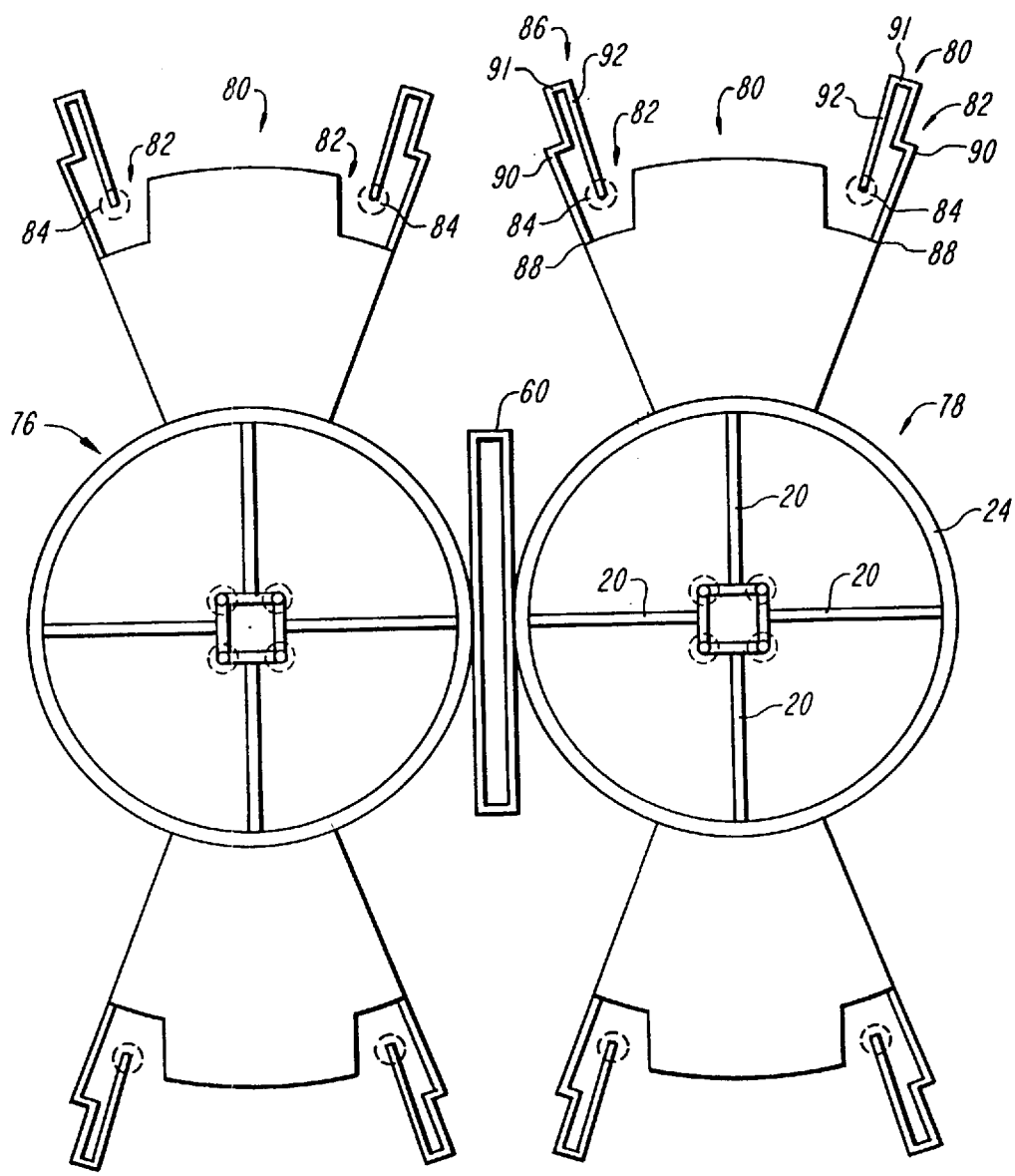

Referring to FIG. 2, in another embodiment of the present invention (with dither drive combs and pickoff combs not shown), identical accelerometers 76, 78 have sectors 80 with cutout corners 82. Sectors 80 are each anchored to the substrate through two suspension beams 86 that support the sector and also allow it to be dithered. Beam 86 has a branch 90 that extends from an end corner 88 at the outer radial edge of the sector to a point beyond the outermost radius of sector 80. To help prevent contact between adjacent masses, branch 90 includes a dog-leg portion. Branch 90 extends to a circumferential portion 91, and then to a branch 92 that doubles-back to an anchor 84 that is centered in cutout region 82. The length of branches 90, 92 allows flexibility when the accelerometer is dithered, and the doubling-back configuration prevents sector 80 from touching the substrate.

Figure 3:
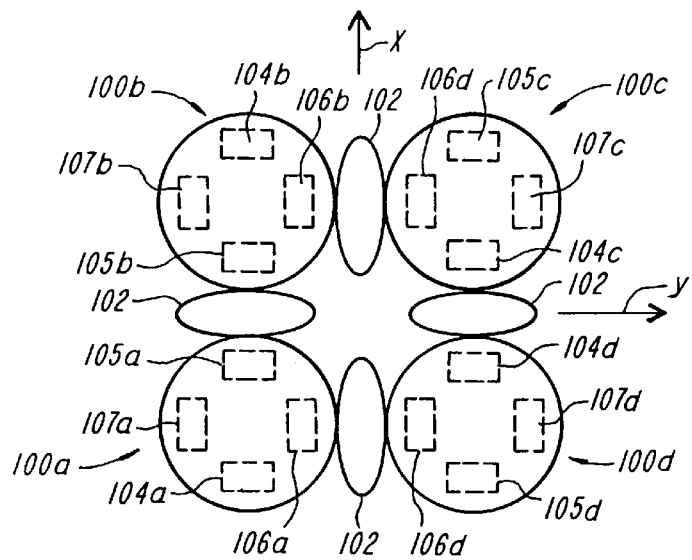

Referring to FIG. 3, in another embodiment of the present invention, four rotating masses 100a–100d are oriented in a square in one device. The masses (shown here only in a representative form without sectors) may have radial sectors that are driven with drive combs or some other dithering means (not shown), and preferably have dither pickoff means (not shown). The masses may also have inwardly extending portions that are suspended over electrodes so that capacitance can be sensed between the portions and corresponding electrodes.

Coupling forks 102 are provided between each pair of adjacent (and not diagonal) masses. These four coupling forks are generally similar in design and purpose to those described in connection with the embodiment of FIG. 1, i.e., they encourage equal anti-phase movement and discourage in-phase movement. While the forks may be rectangular annuluses as shown in FIG. 1, they may instead have rounded ends or have an elongated elliptical shape (and the fork in FIG. 1 may also have one of these other shapes).

The four masses in the embodiment of FIG. 3 preferably have a total of sixteen Coriolis electrodes, four of each of electrodes 104n–107n. The electrodes of like number are electrically coupled to eliminate thermal and electrical gradients. Along each of the x and y axes (which are orthogonal and in the plane of the masses), there are inner and outer electrodes. The electrical coupling is preferably done along each axis such that each inner electrode is coupled to an inner electrode in a same position along the axis, and to outer electrodes in the masses spaced along the other axis.

According to this third embodiment, electrodes 104a–104d and 105a–105d are used to detect rotation about the x axis, and electrodes 106a–106d and 107a–107d are used to detect rotation about the y axis. Thus, rotation can be measured along either or both of the x and y axes with one set of circuitry.

Because of the configuration of the four masses, momentum is conserved relative to the substrate when all four are pairwise dithered in an equal and opposite manner. Therefore, no momentum is transferred to any support frame or to the substrate.

This array can be expanded to additional masses in a two-dimensional array with square cells. Such a larger array can be useful to provide improved measurement because there is some redundancy in the electrodes and masses, and because the overall capacitance is larger.

Figure 4:
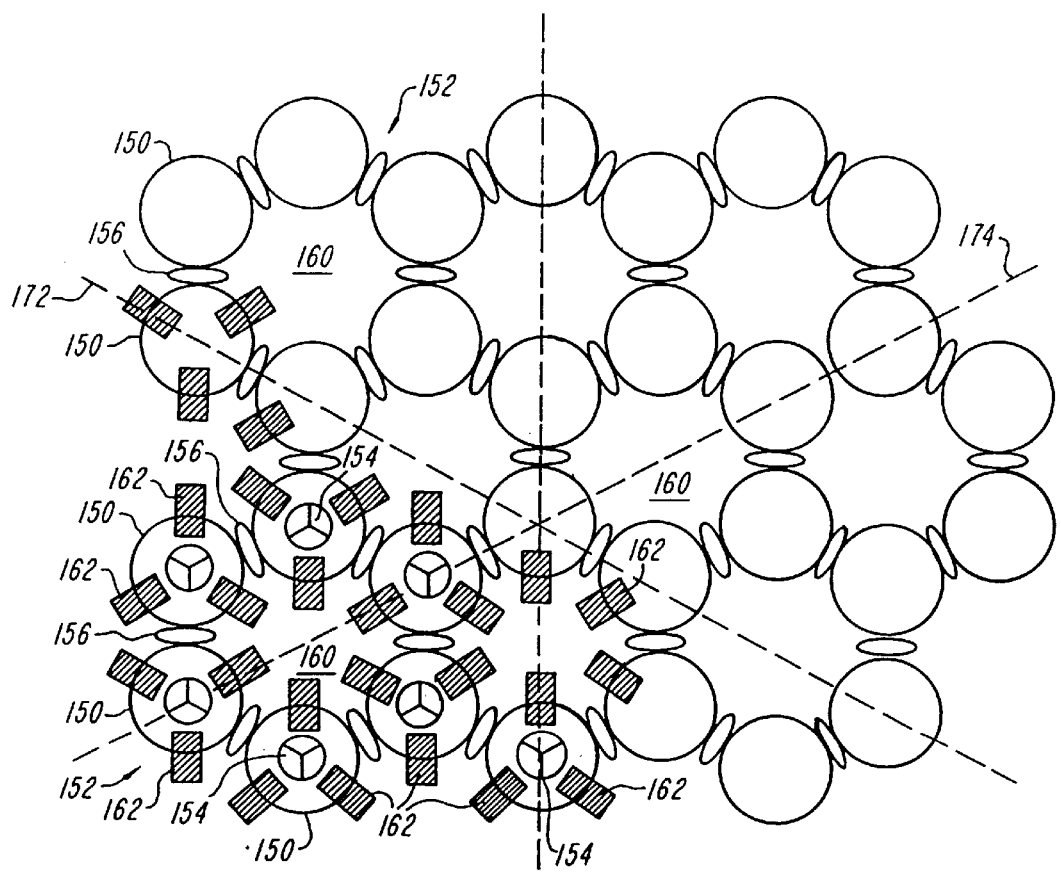

Referring to FIG. 4, in another embodiment, a number of masses 150 is formed in an extended array, arranged as hexagonal cells 152. Each mass 150 is shown in a general form with a central tethering arrangement 154 and with coupling forks 156 between pairs of adjacent masses. Because the masses are arranged in hexagonal cells, within the cells there are open central areas 160 that can be used to accommodate larger electrodes 162 than the square arrangement allows. In addition, this hexagonal arrangement allows for measurement along three (non-orthogonal) directions 170, 172, and 174 in the plane in which the masses lie, thus providing redundancy to improve reliability. The electrodes are preferably electrically coupled to eliminate gradients.

Having described several embodiments of the present invention, it should be apparent that other modifications can be made without departing from the scope of the invention as defined by the appended claims. For example, other types of dither drives and pickoffs can be used. While FIG. 1 shows four tether beams, other arrangements with additional beams, e.g., a total of three, six, or eight beams, could be used. While drive combs 30 are shown in FIG. 1 with one integral member and two sets of fingers extending away, the combs could be formed as separate combs.

What is claimed is:

1. A micromachined device formed in a substrate comprising:

a first mass suspended over the substrate;

a second mass suspended over the substrate;

a third mass suspended over the substrate;

a fourth mass suspended over the substrate;

the four masses arranged so that each mass is adjacent to two other masses; and means for rotationally dithering each of the first, second, third, and fourth masses so that each mass moves in an equal and opposite manner relative to an adjacent mass.

2. The device of claim 1, wherein the four masses are arranged in a square.

3. The device of claim 2, further comprising four couplings, each coupling coupled to a pair of adjacent masses, each coupling minimally resisting relative anti-phase movement between the corresponding pair of adjacent masses, and providing substantial resistance to relative in-phase movement between the corresponding pair of adjacent masses.

4. The device of claim 1, further comprising a first electrode and a second electrode for each mass, wherein the first electrode of each mass is electrically coupled to the second electrode of another mass so as to cancel gradients.

5. The device of claim 4, wherein the first and second electrodes are used to sense a Coriolis acceleration.

6. The device of claim 4, wherein the masses are arranged in a square.

7. The device of claim 1, wherein the four masses are rotationally dithered such that there is no local momentum relative to the substrate.

8. The device of claim 1, further including fifth and sixth masses suspended over the substrate, the first through sixth masses being arranged in a hexagon.

9. A micromachined device formed in a substrate comprising:

a first mass suspended over the substrate and including a circular portion and a sector;

means for rotationally dithering the first mass; and a suspension beam having one end coupled to the sector and extending radially outwardly from the first mass and doubling-back to extend radially inwardly to an anchor at the other end of the suspension beam, the suspension beam resisting gravitational force between the first mass and the substrate and allowing the first mass to be dithered.

10. The device of claim 9, wherein the beam has a dog-leg portion.

11. A micromachined device formed in a substrate comprising:

a first mass suspended over and dithered relative to the substrate and having first and second movable electrodes that are movable relative to the substrate;

a first set of first and second fixed electrodes that are fixed relative to the substrate and spaced from the respective first and second movable electrodes of the first mass for sensing capacitance therebetween;

a second mass suspended over and dithered relative to the substrate, the second mass being dithered in a manner equal and opposite to the dithering of the first mass, the second mass having first and second movable electrodes that are movable relative to the substrate, wherein the first electrodes and second electrodes for each mass are located in similar corresponding positions;

a second set of first and second fixed electrodes that are fixed relative to the substrate and spaced from the respective first and second movable electrodes of the second mass for sensing capacitance therebetween;

wherein the first fixed electrode of the first set is electrically coupled to the second fixed electrode of the second set and the second fixed electrode of the first set is electrically coupled to the first fixed electrode of the second set, the electrical couplings being such that the couplings cancel gradients in the device.

12. The micromachined device of claim 11, further comprising third and fourth masses, each of the third and fourth masses with respective first and second movable electrodes and first and second fixed electrodes.

13. The micromachined device of claim 11, wherein the first and second sets of fixed electrodes are formed on the surface of the substrate.

14. The micromachined device of claim 13, wherein the masses are each dithered rotationally about a central axis.

15. The micromachined device of claim 11, wherein the masses are each dithered rotationally about a central axis.

* * * * *